US012643586B2

(12) United States Patent
Dai

(10) Patent No.: US 12,643,586 B2
(45) Date of Patent: Jun. 2, 2026

(54) CONNECTION COMPONENT AND CART

(71) Applicant: ShenZhen YiHong Technology Co., Ltd., ShenZhen City (CN)

(72) Inventor: Yi Dai, ShenZhen City (CN)

(73) Assignee: ShenZhen YiHong Technology Co., Ltd., ShenZhen City (CN)

( * ) Notice: Subject to any disclaimer, the term of this patent is extended or adjusted under 35 U.S.C. 154(b) by 229 days.

(21) Appl. No.: 18/620,307

(22) Filed: Mar. 28, 2024

(65) Prior Publication Data

US 2025/0249944 A1 Aug. 7, 2025

(30) Foreign Application Priority Data

Feb. 2, 2024 (CN) .......................... 202420279533.7

(51) Int. Cl.
B62B 3/02 (2006.01)

(52) U.S. Cl.
CPC ...................................... B62B 3/02 (2013.01)

(58) Field of Classification Search
CPC ........... B62B 3/02; B62B 3/002; B62B 3/006; B62B 2205/00; B62B 2205/006; F16B 21/06; F16B 21/065; F16B 21/08; F16B 21/082; F16B 21/086; F16B 9/02; F16B 9/07; F16B 9/09; F16B 7/04; F16B 7/0406; F16B 7/042; F16B 7/22
See application file for complete search history.

(56) References Cited

U.S. PATENT DOCUMENTS

| | | | | | |
|---|---|---|---|---|---|
| RE33,438 | E | * | 11/1990 | Stewart | F16B 7/22 |
| | | | | | 24/654 |
| 6,413,004 | B1 | * | 7/2002 | Lin | B25B 27/10 |
| | | | | | 403/171 |
| 6,796,565 | B2 | * | 9/2004 | Choi | B62B 3/02 |
| | | | | | 280/47.35 |
| 9,216,753 | B2 | * | 12/2015 | Bryan | B62B 3/02 |
| 9,909,606 | B2 | * | 3/2018 | Kilgore | F16B 19/08 |
| D835,875 | S | * | 12/2018 | Sokol | D34/21 |
| 10,156,249 | B2 | * | 12/2018 | Edman | F16B 2/185 |
| 11,317,734 | B2 | * | 5/2022 | Yang | A47D 3/00 |
| 11,459,781 | B2 | * | 10/2022 | Huang | E04H 4/0056 |
| 11,597,464 | B2 | * | 3/2023 | Middel | B62K 13/02 |
| D992,315 | S | * | 7/2023 | Dai | D6/675.1 |

(Continued)

FOREIGN PATENT DOCUMENTS

EP 1522482 A2 * 4/2005 .............. B62B 3/02

*Primary Examiner* — Jonathan P Masinick

(74) *Attorney, Agent, or Firm* — Ladas & Parry LLP

(57) ABSTRACT

Connection accessories and a connection component and a cart are disclosed. The connection component includes a connection rod and a connection sleeve. The connection rod includes a first buckle part disposed at a first end and a second buckle part disposed at a second end. The first buckle part and the second buckle part are disposed opposite to each other in a radial direction of the connection rod. A first opening and a second opening that face opposite directions and are running through are disposed on the connection sleeve, the first buckle part may be inserted into the connection sleeve through the second opening, the second buckle part may be inserted into the connection sleeve through the first opening, a buckle protrusion is correspondingly buckled with the limiting part, and a buckle seat is buckled with an edge of the opening.

11 Claims, 8 Drawing Sheets

(56)　　　　　References Cited

U.S. PATENT DOCUMENTS

| | | | |
|---|---|---|---|
| 11,760,535 B2 * | 9/2023 | Dai | B65D 25/282 |
| | | | 220/23.87 |
| D1,006,507 S * | 12/2023 | Dai | D3/313 |
| 12,258,060 B1 * | 3/2025 | Zhou | A47B 47/0083 |
| 12,317,999 B2 * | 6/2025 | Liu | F16B 7/0413 |
| 2014/0217690 A1 * | 8/2014 | Schumaker | B62B 5/00 |
| | | | 280/47.35 |
| 2015/0152654 A1 * | 6/2015 | Yamane | E04G 7/32 |
| | | | 403/187 |
| 2015/0297050 A1 * | 10/2015 | Marsh | A47L 9/242 |
| | | | 15/347 |
| 2018/0195545 A1 * | 7/2018 | Garza Montemayor | |
| | | | F16B 7/042 |
| 2025/0213035 A1 * | 7/2025 | Dai | A47B 45/00 |

* cited by examiner

370

371

500

CONNECTION COMPONENT AND CART

CROSS-REFERENCE TO RELATED APPLICATIONS

This application claims priority to Chinese Patent Applications Nos. 202420279533.7 and 202420519735.4 filed on Feb. 2, 2024. These applications are incorporated herein by reference in their entirety.

TECHNICAL FIELD

This application pertains to the field of connection accessories, and in particular, relates to a connection component and a cart.

BACKGROUND

With increasing improvement of people's living standards, more families choose storage carts that are convenient to move and occupy small spaces to facilitate storage of items in kitchens or bathrooms.

A current storage cart is mainly formed through an integral combination of storage layers and connection rods. A common combination manner of the storage layers and the connection rods is mainly that the storage layers are fastened to the connection rods on two sides by using screws or the connection rods are fixedly inserted into through holes on the storage layers in an interference fit manner, to form a storage cart of a multi-layer structure through combination. However, according to the foregoing assembly method, the installation of the current storage cart is complicated and connection is not firm in a use process. In particular, in a process of lifting the storage cart in the air, the storage layers are usually separated and detached from the connection rods, which is not conducive to adapting to various usage conditions by the storage cart in daily life.

Therefore, improvement is made to provide a connection component and a cart.

SUMMARY

This application provides a connection component, to resolve problems that installation of a storage layer and a connection rod is complicated, and detachment easily occurs due to loose overall assembly.

A connection component is provided, including a connection rod and a connection sleeve, where the connection rod includes a first buckle part disposed at a first end and a second buckle part disposed at a second end, the first buckle part includes a first buckle seat, a first buckle protrusion, and a first connector, and the first buckle protrusion and the first buckle seat are connected by using the first connector.

The first buckle part and the second buckle part are disposed opposite to each other in a radial direction of the connection rod, an avoidance space fitting with the second buckle part is reserved on the first buckle part, and an avoidance space fitting with the first buckle part is reserved on the second buckle part.

The second buckle part includes a second buckle seat, a second buckle protrusion, and a second connector, the second buckle protrusion and the second buckle seat are connected by using the second connector, a distance between the first buckle seat and the first buckle protrusion is less than a distance between the second buckle seat and the second buckle protrusion, and the first connector and the second connector are each made of a plastic material.

A first opening and a second opening that face opposite directions and are running through are disposed on the connection sleeve, a first limiting part and a second limiting part are disposed on an inner wall of the connection sleeve, the first limiting part is disposed at a middle part of the inner wall, the second limiting part is disposed on the inner wall on a side opposite to the first limiting part, and the second limiting part is flush with an edge of the second opening.

The first buckle part may be inserted into the connection sleeve through the second opening, the first buckle protrusion is buckled with the first limiting part, the first buckle seat abuts against the edge of the second opening, the second buckle part may be inserted into the connection sleeve through the first opening, the second buckle protrusion is buckled with the second limiting part, and the second buckle seat abuts against an edge of the first opening.

Further, a guide part is disposed in the connection sleeve, and the guide part is parallel to a buckle direction.

The first buckle part further includes a first guide plate, the first guide plate is inserted into the second opening under the guide action of the guide part, and the first buckle protrusion is buckled with the first limiting part.

Further, a guide part is disposed in the connection sleeve, and the guide part is parallel to a buckle direction.

The second buckle part further includes a second guide plate, the second guide plate is inserted into the first opening under the guide action of the guide part, and the second buckle protrusion is buckled with the second limiting part.

Further, the second limiting part includes two protrusive strips and/or protrusive blocks that are disposed on the inner wall of the connection sleeve, and a minimum spacing between the protrusive strips and/or protrusive blocks is greater than a width of the first buckle protrusion.

Further, an inward flange is disposed on the edge of the first opening, a first groove is disposed on the flange, and the second buckle part is inserted into the connection sleeve through the first groove.

Further, a reinforcing rib is disposed on the inner wall of the connection sleeve in a vertical direction of the inner wall, and the reinforcing rib is in interference fit with a guide plate.

Further, a first guide slope is disposed at a front end of a side that is of the first limiting part and that is close to the second opening, and a second guide slope is disposed at a front end of a side that is of the second limiting part and that is close to the first opening.

Further, a third guide slope is disposed on the first buckle protrusion, and a fourth guide slope is disposed on the second buckle protrusion.

Further, a second groove is disposed at an edge on a side that is at one end of the connection rod and that is opposite to a buckle direction, and the first buckle part is disposed at the end; and a top part of the second buckle protrusion is embedded in the second groove.

This application further provides a cart, including the foregoing connection component, and further including a partition plate, where the connection sleeve is disposed around the partition plate.

Different buckle parts are buckled inside the connection sleeve and on an edge of the connection sleeve to form a fastened connection component, the buckle parts and the connection sleeve are respectively disposed on the connection rod and the partition plate, and the connection sleeve can simultaneously accommodate buckle parts that buckle upper and lower connection rods, to form a combination in which the upper and lower connection rods are fixedly connected to the partition plate. Therefore, the cart is simply and conveniently combined and arranged, and overall stability of the cart is greatly improved. This is more conducive to transferring and moving the cart in daily use, and expanding usage scenarios of the cart.

DESCRIPTION OF REFERENCE NUMERALS

Figure 1:
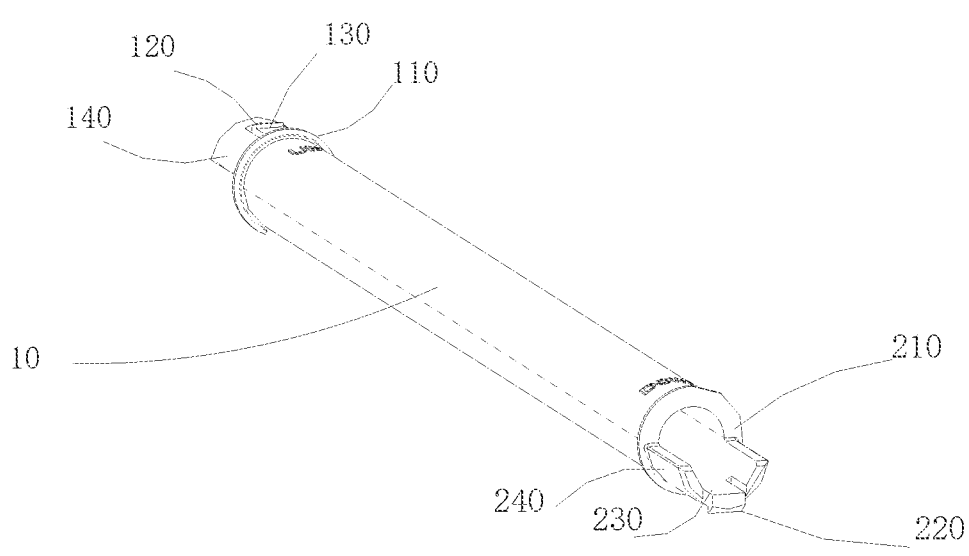
FIG. 1 is a schematic diagram of a structure of a connection rod of a connection component according to an embodiment of this application.

10—connection rod;
100—first buckle part; 110—first buckle seat; 120—first buckle protrusion; 121—third guide slope; 130—first connector; 140—first guide plate;
200—second buckle part; 210—second buckle seat; 220—second buckle protrusion; 221—fourth guide slope; 230—second connector; 240—second guide plate;
300—connection sleeve; 310—first opening; 320—second opening; 330—second limiting part; 340—first limiting part; 350—guide part; 360—reinforcing rib; 370—flange; 371—first groove; 380—first guide slope; 390—second guide slope;
400—partition plate; and
500—second groove.

DETAILED DESCRIPTION

To make the objectives, technical solutions, and advantages of this application clearer, the following further describes this application in detail with reference to the accompanying drawings and embodiments. The examples of the embodiments are shown in the accompanying drawings, and same or similar reference numerals represent same or similar elements or elements with same or similar functions. The following embodiments described with reference to the accompanying drawings are examples, and are merely intended to explain this application, but should not be construed as a limitation on this application. In addition, it should be understood that specific embodiments described herein are merely intended to explain this application, but are not intended to limit this application.

In the descriptions of this application, it should be understood that directions or positional relationships indicated by terms such as "length", "width", "upper", "lower", "left", "right", "horizontal", "top", and "bottom" are directions or positional relationships shown based on the accompanying drawings, are merely used for facilitating description of this application and for description simplicity, and do not indicate or imply that an indicated apparatus or element needs to have a specific direction or needs to be constructed and operated in a specific direction. Therefore, this should not be understood as a limitation on this application.

In addition, the terms "first" and "second" are used merely for description purposes, and cannot be understood as indicating or implying relative importance or implicitly indicating the quantity of indicated technical features. Therefore, features defined with "first" and "second" may explicitly or implicitly include one or more of the features. In the descriptions of this application, "a plurality of" means two or more, unless otherwise specifically limited.

In the descriptions of this application, it should be noted that, unless otherwise specified or limited, terms "install", "communicate", and "connect" should be understood in a broad sense, for example, may be a fixed connection, a detachable connection, or an integrated connection, may be a mechanical connection, an electrical connection, or mutual communication, may be a direct connection or an indirect connection implemented by using an intermediate medium, or may be communication between two elements or an interaction relationship between two elements. For a person of ordinary skill in the art, specific meanings of the foregoing terms in this application may be understood based on specific situations.

In this application, unless otherwise specified and limited, "a first feature is located above or below a second feature" may include direct contact between the first feature and the second feature, or may include contact, instead of direct contact, that is between the first feature and the second feature and that is implemented by using another feature between the first feature and the second feature. In addition, "a first feature is located above a second feature" includes "the first feature is located directly above and diagonally above the second feature", or merely indicates that a horizontal height of the first feature is higher than that of the second feature. "A first feature is located below a second feature" includes "the first feature is located directly below and diagonally below the second feature", or merely indicates that a horizontal height of the first feature is lower than that of the second feature.

The following disclosure provides many different embodiments or examples for implementing different structures of this application. To simplify the disclosure of this application, components and settings of specific examples are described below. Certainly, the components and the settings are merely examples and are not intended to limit this application. In addition, reference numerals and/or reference letters may be repeated in different examples in this application for simplicity and clarity purposes, and do not indicate a relationship between the various embodiments and/or settings discussed. In addition, this application provides examples of various specific processes and materials, but a person of ordinary skill in the art may be aware of application of other processes and/or use of other materials.

Different buckle parts are buckled inside a connection sleeve and on an edge of the connection sleeve to form a fastened connection component, the buckle parts and the connection sleeve are respectively disposed on a connection rod and a partition plate, and the connection sleeve can simultaneously accommodate buckle parts that buckle upper and lower connection rods, to form a combination in which the upper and lower connection rods are fixedly connected to the partition plate. Therefore, a cart is simply and conveniently combined and arranged, and overall stability of the cart is greatly improved. This is more conducive to transferring and moving the cart in daily use, and expanding usage scenarios of the cart.

Embodiment 1

Refer to FIG. 1 to FIG. 4. An embodiment of this application provides a connection component, including a connection rod 10 and a connection sleeve 300, where the connection rod 10 includes a first buckle part 100 disposed at a first end and a second buckle part 200 disposed at a second end, the first buckle part 100 includes a first buckle seat 110, a first buckle protrusion 120, and a first connector 130, and the first buckle protrusion 120 and the first buckle seat 110 are connected by using the first connector 130.

The first buckle part 100 and the second buckle part 200 are disposed opposite to each other in a radial direction of the connection rod 10, an avoidance space fitting with the second buckle part 200 is reserved on the first buckle part 100, and an avoidance space fitting with the first buckle part 100 is reserved on the second buckle part 200. Therefore, it is ensured that the first buckle part 100 and the second buckle part 200 can be accommodated in the connection sleeve 300 simultaneously.

The second buckle part 200 includes a second buckle seat 210, a second buckle protrusion 220, and a second connector 230. The second buckle protrusion 220 and the second buckle seat 210 are connected by using the second connector 230, a distance between the first buckle seat 110 and the first buckle protrusion 120 is less than a distance between the second buckle seat 210 and the second buckle protrusion 220, and the first connector 130 and the second connector 230 are each made of a plastic material. In this case, unequal lengths of the distance between the first buckle seat 110 and the first buckle protrusion 120 and the distance between the second buckle seat 210 and the second buckle protrusion 220 are set, so that positions of two buckle structures are staggered. Therefore, the buckle part can be prevented from being connected to a wrong limiting part during arrangement, and there is no need to deliberately distinguish a fitting buckle position during installation, thereby accelerating installation and simplifying an installation operation.

A first opening 310 and a second opening 320 that face opposite directions and are running through are disposed on the connection sleeve 300, a first limiting part 340 and a second limiting part 330 are disposed on an inner wall of the connection sleeve 300, the first limiting part 340 is disposed at a middle part of the inner wall, and the second limiting part 330 is disposed on the inner wall on a side opposite to the first limiting part 340 and is flush with an edge of the second opening 320.

The first limiting part 340 and the second limiting part 330 are disposed in a staggered manner, so that the buckle part can be prevented from being connected to the wrong limiting part during arrangement. In addition, the second limiting part 330 is disposed at the edge of the second opening 320. When the second buckle part 200 is buckled with the second limiting part 330, the connection rod 10 can be firmly and integrally connected to a partition plate 400 subsequently. Optionally, the limiting part may use a limiting boss, a convex limiting rib, or the like.

During connection, the first buckle part 100 may be inserted into the connection sleeve 300 through the second opening 320, the first buckle protrusion 120 is buckled with the first limiting part 340, the first buckle seat 110 abuts against the edge of the second opening 320, the second buckle part 200 may be inserted into the connection sleeve 300 through the first opening 310, the second buckle protrusion 220 is buckled with the second limiting part 330, and the second buckle seat 210 abuts against an edge of the first opening 310.

The buckle protrusion, the limiting part, the buckle seat, and an edge of the connection sleeve 300 are buckled with and fit with each other. In this way, simpler and more efficient installation is implemented by using the buckle part and the connection sleeve 300, and the connection component formed through buckling is more tight and secure.

Preferably, the first connector 130 and the second connector 230 are elastic members, which is more conducive to smoothly and integrally sliding the buckle part from the limiting part to a buckle position.

Embodiment 2

Figure 4:
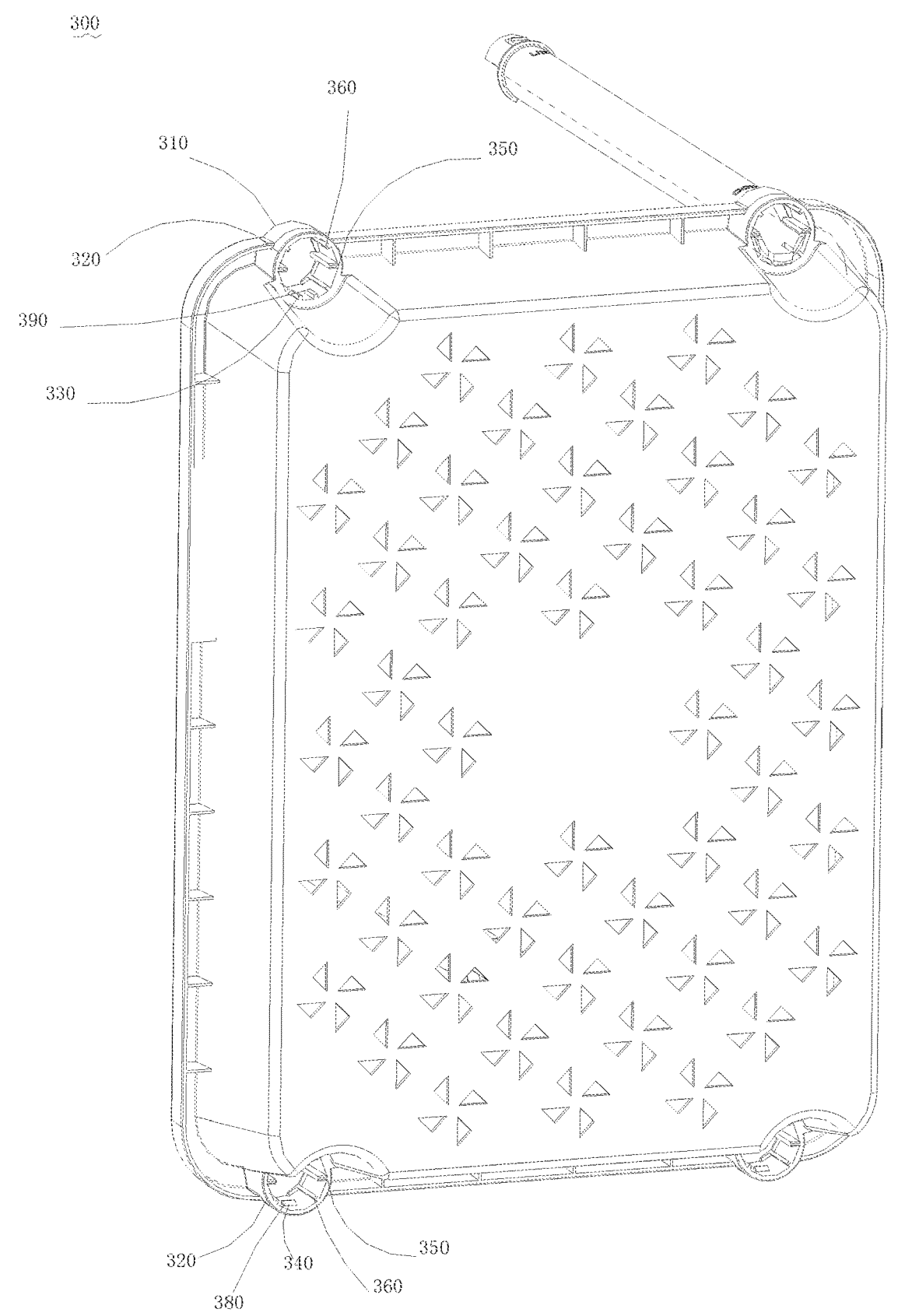
FIG. 4 is a schematic diagram of a structure of a connection sleeve of a connection component according to an embodiment of this application.

Refer to FIG. 4. An embodiment of this application further includes: A guide part 350 is disposed in the connection sleeve 300, and the guide part 350 is parallel to a buckle direction.

The first buckle part 100 further includes a first guide plate 140. Optionally, the first guide plate 140 and the first buckle part 100 are disposed on a same plane, and the first guide plate 140 may be continuously connected to the first buckle part 100 or may be connected to the first buckle seat 110 and surround the first connector 130 and the first buckle protrusion 120, where there is a gap between the first guide plate 140 and both of the first connector 130 and the first buckle protrusion 120. When in use, the first guide plate 140 is inserted into the second opening 320 under the guide action of the guide part 350, and the first buckle protrusion 120 is buckled with the first limiting part 340.

The first guide plate 140 and the guide part 350 are respectively disposed on the first buckle part 100 and the connection sleeve 300, and fit with each other to play a guide role, to guide the first buckle part 100 to be inserted into the connection sleeve 300. Therefore, more convenient installation is implemented.

The guide part 350 may use a connection plate disposed at a middle part of the connection sleeve 300, or two connection plates separately connected to the inner wall of the connection sleeve 300 and located in a same horizontal plane. Preferably, the connection plate disposed at the middle part of the connection sleeve 300 is more conducive to improving rigidity at a connection position, prolonging a service life, and strengthening an anti-damage capability.

Embodiment 3

Refer to FIG. 4. An embodiment of this application further includes: A guide part 350 is disposed in the connection sleeve 300, and the guide part 350 is parallel to a buckle direction.

The second buckle part 200 further includes a second guide plate 240. Preferably, the second guide plate 240 is disposed on two sides of the second buckle part 200, is connected to the second buckle seat 210, and is not higher than the second connector 230. When in use, the second guide plate 240 is inserted into the first opening 310 under the guide action of the guide part 350, and the second buckle protrusion 220 is buckled with the second limiting part 330.

The second guide plate and the guide part 350 are respectively disposed on the second buckle part 200 and the connection sleeve 300, and fit with each other to play a guide role, to guide the second buckle part 200 to be inserted into the connection sleeve 300. Therefore, more convenient installation is implemented. The guide part 350 may use a connection plate disposed at a middle part of the connection sleeve 300, or two connection plates separately connected to the inner wall of the connection sleeve 300 and located in a same horizontal plane. Preferably, the connection plate disposed at the middle part of the connection sleeve 300 is more conducive to improving rigidity at a connection position, prolonging a service life, and strengthening an anti-damage capability.

In addition, the guide part 350 in this embodiment may be the same as the guide part 350 in Embodiment 2, so that materials can be saved.

Embodiment 4

Refer to FIG. 4. In an embodiment of this application, the second limiting part 330 includes two protrusive strips and/or protrusive blocks that are disposed on the inner wall of the connection sleeve, and a minimum spacing between the protrusive strips and/or protrusive blocks is greater than a width of the first buckle protrusion 120.

The second limiting part 330 is disposed as two independent protrusive strips and/or protrusive blocks whose spacing is greater than the width of the first buckle protrusion 120. During assembly, if the first buckle part 100 is inserted, the first buckle protrusion 120 cannot be buckled with the second limiting part 330 because the width of the first buckle protrusion 120 is less than the spacing between the independent protrusive strips and/or protrusive blocks, thereby avoiding a possibility of incorrect assembly. On the contrary, assembly convenience can be improved and assembly difficulty can be reduced.

Embodiment 5

Figure 5:
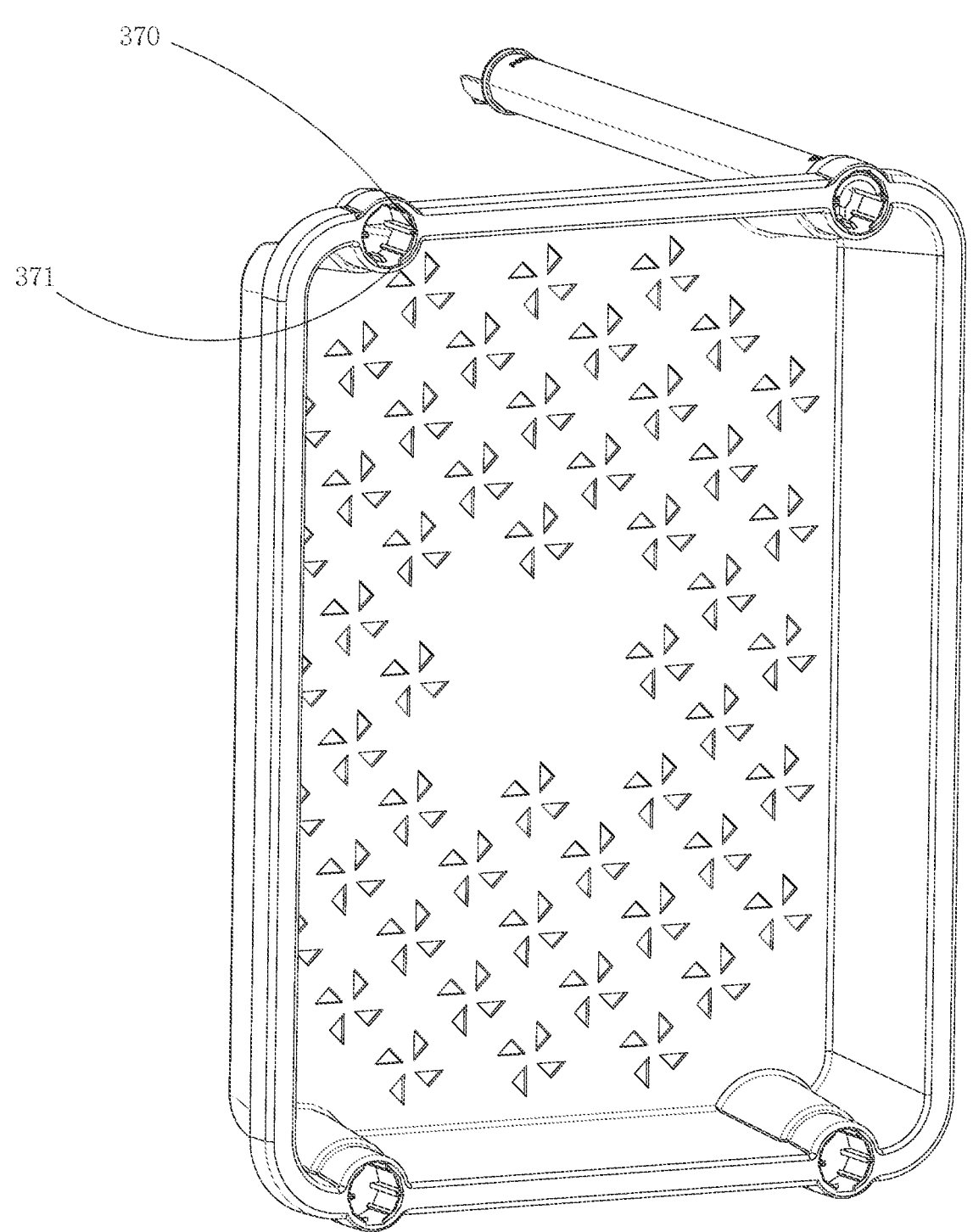
FIG. 5 is a schematic diagram of another structure of a connection sleeve of a connection component according to an embodiment of this application.

Refer to FIG. 5. In an embodiment of this application, an inward flange 370 is disposed on the edge of the first opening 310, a first groove 371 is disposed on the flange, and the second buckle part 200 is inserted into the connection sleeve 300 through the first groove 371. The flange 370 can enable the second buckle seat 210 to more stably abut against the edge of the first opening 310. The first groove 371 is disposed to enable the second buckle part 200 to smoothly enter the connection sleeve through the flange 370, and provide guidance for insertion of the second buckle part 200.

Embodiment 6

Refer to FIG. 4. In an embodiment of this application, a reinforcing rib 360 is disposed on the inner wall of the connection sleeve 300 in a vertical direction of the inner wall, and the reinforcing rib 360 is in interference fit with the first guide plate 140 and the second guide plate 240.

The reinforcing rib 360 is disposed in the vertical direction of the inner wall to enhance overall strength of the connection sleeve 300 and prolong a service life of the connection sleeve 300. In a use process, when the connection component is lifted, pulled, and moved, overall stability can be better ensured.

In addition, the interference fit between the reinforcing rib 360 and the guide plate can enable the buckle part to completely fill the entire connection sleeve 300 without a gap between the buckle part and the connection sleeve 300, so that the connection sleeve 300 and the buckle part are assembled together perfectly and firmly.

Preferably, there are four reinforcing ribs 360, which are evenly distributed on the inner wall of the connection sleeve 300.

Embodiment 7

Refer to FIG. 4. In an embodiment of this application, a first guide slope 380 is disposed at a front end of a side that is of the first limiting part 340 and that is close to the second opening 320, and a second guide slope 390 is disposed at a front end of a side that is of the second limiting part 330 and that is close to the first opening 310. The guide slope on the limiting part is conducive to guiding the buckle part to enter a buckle position in the connection sleeve 300 smoothly.

Embodiment 8

Figure 2:
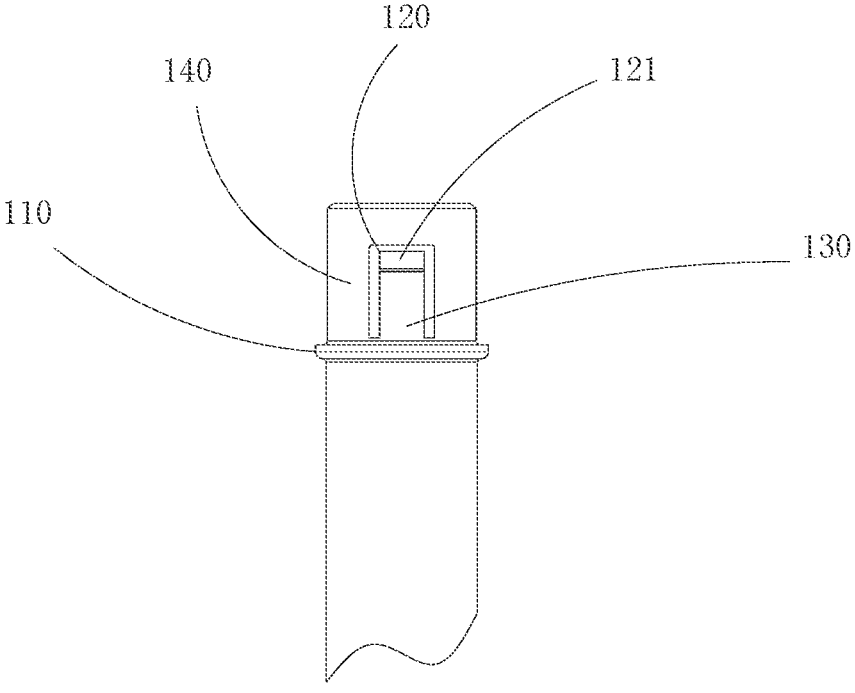
FIG. 2 is a schematic diagram of a structure of a first buckle part of a connection component according to an embodiment of this application.
Figure 3:
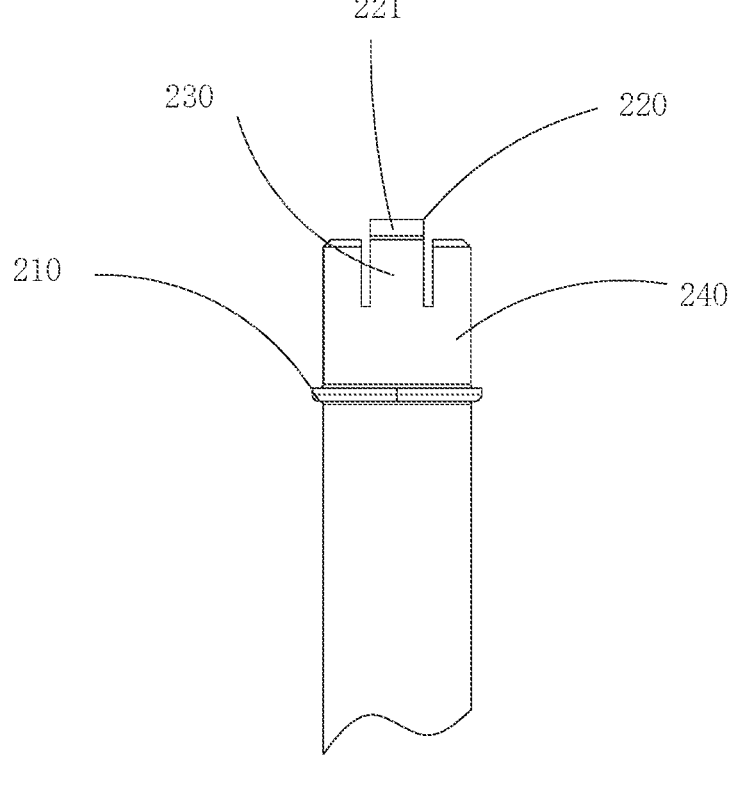
FIG. 3 is a schematic diagram of a structure of a second buckle part of a connection component according to an embodiment of this application.

Refer to FIG. 2 and FIG. 3. In an embodiment of this application, a third guide slope 121 is disposed on the first buckle protrusion 120, and a fourth guide slope 221 is disposed on the second buckle protrusion 220. The guide slope on the buckle protrusion can guide the buckle part to enter a buckle position in the connection sleeve 300 smoothly.

Embodiment 9

Figure 8:
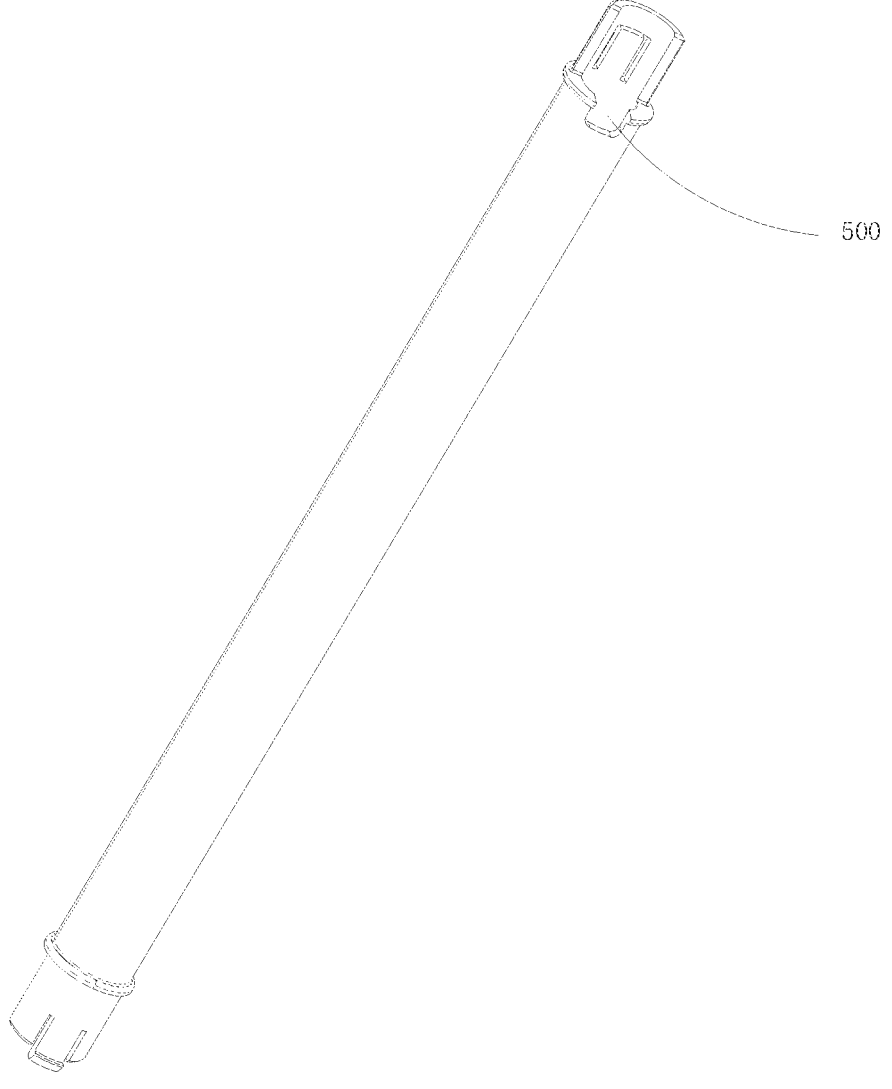
FIG. 8 is a schematic diagram of a connection rod of a cart according to an embodiment of this application.

Refer to FIG. 8. In an embodiment of this application, a second groove 500 is disposed at an edge on a side that is at one end of the connection rod 10 and that is opposite to a buckle direction, where the first buckle part 100 is disposed at the end; and a top part of the second buckle protrusion 220 is embedded in the second groove 500. The top part of the second buckle protrusion 220 is embedded in the second groove 500. In this way, the second buckle protrusion 220 can be exactly embedded in the continuously connected connection rod 10 to form an integrated body, thereby implementing aesthetics and preventing the exposed second buckle protrusion 220 from scratching a user in a use process. In addition, in an assembly process, a fitting relationship between the second buckle protrusion 220 and the second groove 500 can further provide an anchor point during assembly, so that an installation process is simpler.

Embodiment 10

Figure 6:
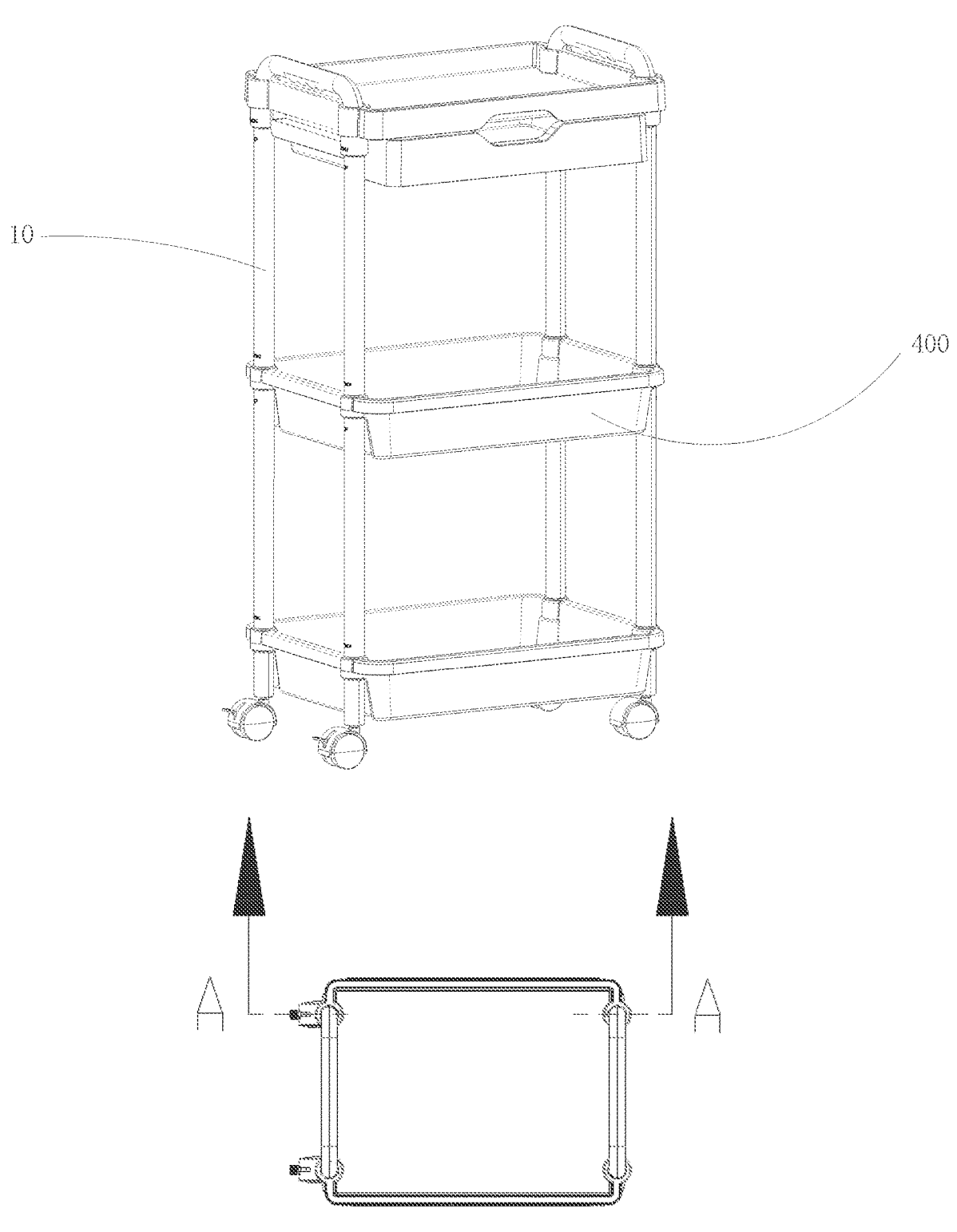
FIG. 6 is a schematic diagram of a cart according to an embodiment of this application.
Figure 7:
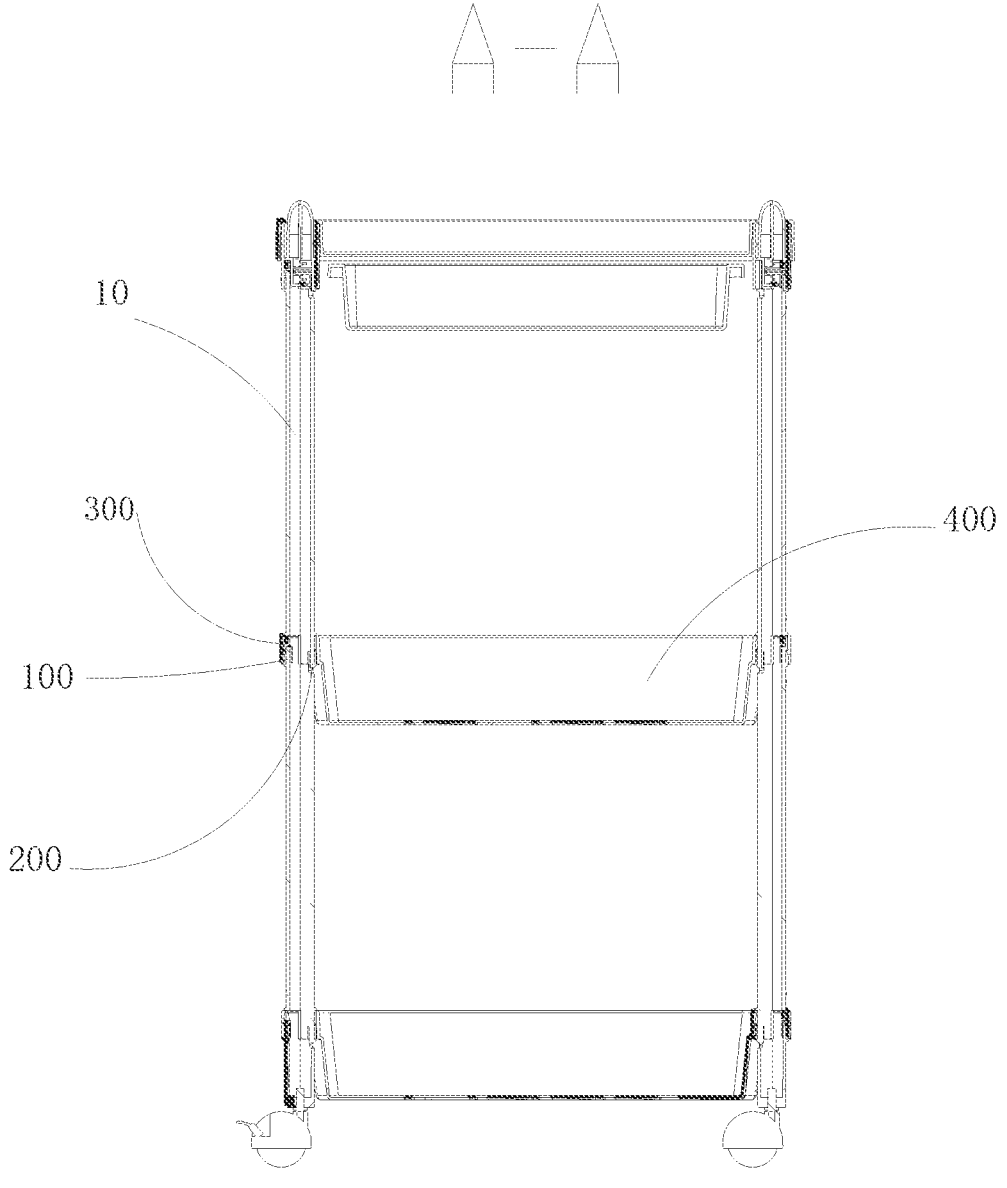
FIG. 7 is a cross-sectional view of a surface A-A of a cart according to an embodiment of this application.

Refer to FIG. 6 and FIG. 7. This embodiment provides a cart, including the connection component described in any one of Embodiment 1 to Embodiment 9, and further including a partition plate 400, where the connection sleeve 300 is disposed around the partition plate 400.

In this embodiment, the buckle part and the connection sleeve 300 are respectively disposed on the connection rod 10 and the partition plate 400, and the connection sleeve 300 may simultaneously accommodate buckle parts that buckle upper and lower connection rods 10 to form a combination in which the upper and lower connection rods 10 are fixedly connected to the partition plate 400. By analogy, the connection rod 10 and the partition plate 400 are sequentially connected to obtain, as required, carts with different quantities of layers through combination, to meet different cart use requirements.

Figure 9:
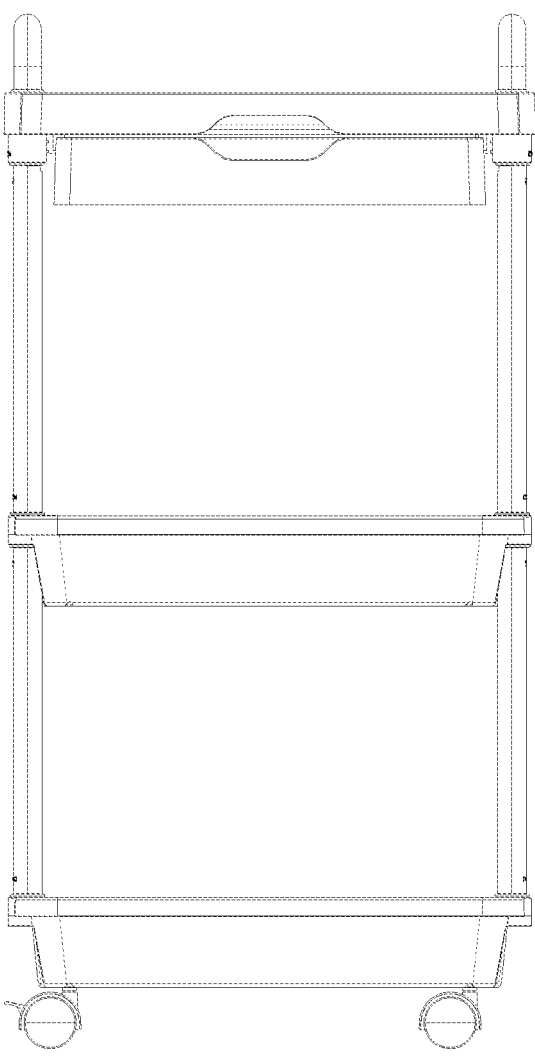
FIG. 9 is a schematic diagram of a cart according to an embodiment of this application.

Optionally, a drawer may be installed on a specific partition plate 400 based on a specific use scenario, as shown in FIG. 5 and FIG. 9. To improve convenience of the cart, a universal wheel may be installed at one end that is of the connection rod 10 on the cart and that is close to the ground or at the bottom of the partition plate 400 at the bottommost layer, to facilitate ease of use during pushing.

Different buckle parts are buckled inside the connection sleeve 300 and on an edge of the connection sleeve 300 to form a fastened connection component, the buckle parts and the connection sleeve are respectively disposed on the connection rod 10 and the partition plate 400, and the connection sleeve 300 can simultaneously accommodate the buckle parts that buckle the upper and lower connection rods, to form the combination in which the upper and lower connection rods 10 are fixedly connected to the partition plate 400. Therefore, the cart is simply and conveniently combined and arranged, and overall stability of the cart is greatly improved. This is more conducive to transferring and moving the cart in daily use, and expanding usage scenarios of the cart.

The foregoing descriptions are merely preferred embodiments of this application, and are not intended to limit this application. Any modification, equivalent replacement, or improvement made within the spirit and principle of this application shall fall within the protection scope of this application.

What is claimed is:

1. A connection component, comprising a connection rod and a connection sleeve, wherein the connection rod comprises a first buckle part disposed at a first end and a second buckle part disposed at a second end, the first buckle part comprises a first buckle seat, a first buckle protrusion, and a first connector, and the first buckle protrusion and the first buckle seat are connected by using the first connector;

the first buckle part and the second buckle part are disposed opposite to each other in a radial direction of the connection rod, an avoidance space fitting with the second buckle part is reserved on the first buckle part, and an avoidance space fitting with the first buckle part is reserved on the second buckle part;

the second buckle part comprises a second buckle seat, a second buckle protrusion, and a second connector, the second buckle protrusion and the second buckle seat are connected by using the second connector, a distance between the first buckle seat and the first buckle protrusion is less than a distance between the second buckle seat and the second buckle protrusion, and the first connector and the second connector are each made of a plastic material;

a first opening and a second opening that face opposite directions and are running through are disposed on the connection sleeve, a first limiting part and a second limiting part are disposed on an inner wall of the connection sleeve, the first limiting part is disposed at a middle part of the inner wall, the second limiting part is disposed on the inner wall on a side opposite to the first limiting part, and the second limiting part is flush with an edge of the second opening; and the first buckle part may be inserted into the connection sleeve through the second opening, the first buckle protrusion is buckled with the first limiting part, the first buckle seat abuts against the edge of the second opening, the second buckle part may be inserted into the connection sleeve through the first opening, the second buckle protrusion is buckled with the second limiting part, and the second buckle seat abuts against an edge of the first opening.

2. The connection component according to claim 1, wherein a guide part is disposed in the connection sleeve, and the guide part is parallel to a buckle direction; and the first buckle part further comprises a first guide plate, the first guide plate is inserted into the second opening under the guide action of the guide part, and the first buckle protrusion is buckled with the first limiting part.

3. The connection component according to claim 2, wherein a reinforcing rib is disposed on the inner wall of the connection sleeve in a vertical direction of the inner wall, and the reinforcing rib is in interference fit with the first guide plate.

4. The connection component according to claim 1, wherein a guide part is disposed in the connection sleeve, and the guide part is parallel to a buckle direction; and the second buckle part further comprises a second guide plate, the second guide plate is inserted into the first opening under the guide action of the guide part, and the second buckle protrusion is buckled with the second limiting part.

5. The connection component according to claim 4, wherein a reinforcing rib is disposed on the inner wall of the connection sleeve in a vertical direction of the inner wall, and the reinforcing rib is in interference fit with the second guide plate.

6. The connection component according to claim 1, wherein the second limiting part comprises two protrusive strips and/or protrusive blocks that are disposed on the inner wall of the connection sleeve, and a minimum spacing between the protrusive strips and/or protrusive blocks is greater than a width of the first buckle protrusion.

7. The connection component according to claim 1, wherein an inward flange is disposed on the edge of the first opening, a first groove is disposed on the flange, and the second buckle part is inserted into the connection sleeve through the first groove.

8. The connection component according to claim 1, wherein a first guide slope is disposed at a front end of a side that is of the first limiting part and that is close to the second opening, and a second guide slope is disposed at a front end of a side that is of the second limiting part and that is close to the first opening.

9. The connection component according to claim 1, wherein a third guide slope is disposed on the first buckle protrusion, and a fourth guide slope is disposed on the second buckle protrusion.

10. The connection component according to claim 1, wherein a second groove is disposed at an edge on a side that is at one end of the connection rod and that is opposite to a buckle direction, and the first buckle part is disposed at the end; and a top part of the second buckle protrusion is embedded in the second groove.

11. A cart, comprising the connection component according to claim 1, and further comprising a partition plate, wherein the connection sleeve is disposed around the partition plate.

* * * * *